(12) United States Patent
Kiss

(10) Patent No.: US 8,198,339 B2
(45) Date of Patent: Jun. 12, 2012

(54) METHOD FOR THE PRODUCTION OF FUELS FROM WASTE

(75) Inventor: Günter H. Kiss, Lesa (IT)

(73) Assignee: Thermoselect Aktiengesellschaft, Triesenberg (LI)

( * ) Notice: Subject to any disclaimer, the term of this patent is extended or adjusted under 35 U.S.C. 154(b) by 337 days.

(21) Appl. No.: 12/439,628

(22) PCT Filed: Aug. 24, 2007

(86) PCT No.: PCT/EP2007/007456
§ 371 (c)(1),
(2), (4) Date: May 4, 2009

(87) PCT Pub. No.: WO2008/025493
PCT Pub. Date: Mar. 6, 2008

(65) Prior Publication Data
US 2010/0022667 A1    Jan. 28, 2010

(30) Foreign Application Priority Data

Aug. 31, 2006  (DE) .................. 10 2006 040 770

(51) Int. Cl.
*C07C 27/00* (2006.01)
(52) U.S. Cl. .................. 518/705; 518/700; 518/702
(58) Field of Classification Search .......... 570/700, 570/702, 705
See application file for complete search history.

(56) References Cited

U.S. PATENT DOCUMENTS

| | | | |
|---|---|---|---|
| 6,190,429 | B1 | 2/2001 | Fujimura et al. |
| 7,214,720 | B2 * | 5/2007 | Bayle et al. ............ 518/700 |
| 2007/0100003 | A1 | 5/2007 | Holley et al. |

FOREIGN PATENT DOCUMENTS

| | | |
|---|---|---|
| DE | 19928581 | 1/2001 |
| EP | 0726307 | 8/1996 |
| EP | 0790291 | 8/1997 |
| EP | 1252264 | 8/2001 |
| EP | 1187891 | 3/2002 |
| EP | 1377358 | 1/2004 |
| EP | 1526165 | 4/2005 |
| RU | 2208475 C2 | 7/2003 |
| RU | 2217199 C1 | 11/2003 |
| WO | 2004072207 | 8/2004 |
| WO | 2004080926 | 9/2004 |

OTHER PUBLICATIONS

International Search Report for PCT/EP2007/007456, Mar. 6, 2008.
International Preliminary Report on Patentability for PCT/EP2007/00756, Mailed Apr. 9, 2009, 10 pages.

* cited by examiner

Primary Examiner — Jafar Parsa
(74) Attorney, Agent, or Firm — Faegre Baker Daniels LLP

(57) ABSTRACT

The invention relates to a method for the disposal and utilization of waste materials of all types, in which the waste materials are compressed in batches to form compact packets and pass through temperature treatment zones, synthesis gas being produced, and the synthesis gas is converted in a subsequent reaction into hydrocarbon molecules for the production of fuel.

10 Claims, No Drawings

METHOD FOR THE PRODUCTION OF FUELS FROM WASTE

CROSS-REFERENCE TO RELATED APPLICATIONS

The present application is a national phase application of PCT application PCT/EP2007/007456 filed pursuant to 35 U.S.C. §371, which claims priority to DE 10 2006 040 770.9 filed Aug. 31, 2006. Both applications are incorporated herein by reference in their entirety.

FIELD OF THE INVENTION

The present invention relates to a method in which synthesis gas is produced from waste and is then converted into hydrocarbons. The hydrocarbons which are produced can be used as fuels.

BACKGROUND

The price of oil price in the last few years has continued to rise. Even if the oil price falls partly in the interim, a high oil price must be assumed in the long term so that alternative methods for the production of fuel will become of greater interest in the future.

The best known method for the alternative production of fuel is the Fischer-Tropsch synthesis. The Fischer-Tropsch process is an industrial scale method for the conversion of synthesis gas ($CO/H_2$) into liquid hydrocarbons. It is a synthesis reaction of $CO/H_2$ mixtures on iron- or cobalt catalysts to form paraffins, alkenes and alcohols.

The chemical mechanism of the Fischer-Tropsch synthesis reaction (polymerisation) leads mainly to long-chain, only slightly branched (i.e. essentially linear) hydrocarbon molecules. Different chain lengths are found in the product mixture. The chain length range of $C_5$-$C_{20}$ is of particular interest for the production of fuels. The chain length can be adjusted by choice of catalyst (cobalt, iron, with promoters) and synthesis conditions (above all temperature, synthesis gas composition, pressure). The primary Fischer-Tropsch synthesis products are then processed chemically in the direction of higher fuel yields and qualities (e.g. hydrocracking, isomerisation, i.e. methods of crude oil processing).

Because of the characteristic feature of the chemical synthesis mechanism of forming mainly only slightly branched hydrocarbon molecules, the product is particularly suitable as a high-quality diesel fuel with a high cetane number and extremely low contents of sulphur and aromatics. Product mixtures with different hydrocarbon chain lengths can furthermore be specified with respect to vapour pressure, and/or distillation curves, inter alias by applying the highly developed crude oil refinery methods. These synthetically produced diesel fuels have the advantage of being particularly low-pollution and hence environmentally friendly.

At the moment, South Africa is the only country which covers a large part of its fuel requirements by means of the Fischer-Tropsch reaction. The synthesis gas for the synthesis is produced there from coal.

In Germany, the company Choren has developed a method for producing synthesis gas for the first time from biomass with the Carbo-V process and then fuel (so-called SunDiesel) with the help of the Fischer-Tropsch process. The Carbo-V® process is a three-stage gassing process with the partial processes:
  low temperature gassing,
  high temperature gassing and
  endothermic flue flow gassing The biomass (water content 15-20%) is carbonised in the first process step continuously by partial oxidation (carbonising) with air or oxygen at temperatures between 400 and 500° C., i.e. broken down into tar-containing gas (volatile components) and solid carbon (biocoke).

In the second process step, the tar-containing gas is reoxidised in a combustion chamber above the ash-fusion point of the combustible materials substoichiometrically with air and/or oxygen to form a hot gasification medium.

In the third process step, the biocoke which is ground to form pulverised fuel is blown into the hot gasification medium. Pulverised fuel and gasification medium thereby react endothermally in the gasification reactor to form synthesis crude gas. This can be used then after corresponding conditioning as combustible gas for the production of current, steam and heat or as synthesis gas with the help of the Fischer-Tropsch process for the production of SunDiesel. Disadvantages of this process are that the gasification takes place in several steps and the biocoke must be ground up. In addition, this method is not suitable for gasification of wastes of all types.

It is hence an object of the present invention to provide a method which allows gasification of waste and also subsequent synthesis of fuels, as far as possible the entirety of the waste being able to be used.

SUMMARY

According to an embodiment of the invention, a method for the disposal and use of waste materials of all types is provided, in which the waste materials are subjected to ozone-wise temperature impingement and thermal separation or material conversion, and the resulting solid residues are converted into a high temperature melt. The waste materials are compressed in batches to form compact packets and pass through temperature treatment zones, with at least one low temperature zone and at least one high temperature zone. The synthesis gas produced from the disposal material, in the direction of increasing temperature, passes through a gas-permeable bed and also a stabilisation zone. The synthesis gas which is situated above the bed and subsequently is conducted out of the stabilisation zone is converted in a subsequent reaction into hydrocarbon molecules. The reaction product can be a fuel such as diesel fuel.

One advantage of the method is that waste materials of all types, i.e. waste which is treated, untreated, containing pollutants and hazardous material and also biowaste, can be used without carrying out complex separation processes. A method of this type is known as the Thermoselect method and is described in more detail for example in the European patents EP 1 187 891 B1, EP 1 252 264 B1, EP 1 377 358 B1, EP 0 790 291 B1 or EP 0 726 307 B1. Similar detail is contained in U.S. Pat. Nos. 5,282,431, 5,711,924, 5,987,899 and 5,960,722. The entire disclosure content of these patents is herewith incorporated by reference. The Thermoselect method may be generally summarized as follows.

During the first process step the waste is delivered to a press in which it is compacted, liquids are distributed, and residual air is pressed out (removal of the nitrogen ballast). A high compressive force is applied to form gastight plugs from the waste and to press it into a degassing duct.

With increasing heat, the waste is dried, organic constituents are degassed and enter a high temperature reactor. The carbon and carbon compounds produced are gasified under controlled addition of oxygen at temperatures up to 2000° C.

in an environment rich in water vapor. The following exothermic reactions lead to the formation of carbon monoxide and carbon dioxide.

$$C + \tfrac{1}{2}O_2 ==> CO$$

$$C + O_2 ==> CO_2$$

$$2C_xH_y + (2X+Y/2)O_2 ==> 2xCO_2 + YH_2O$$

The endothermic Boudouard reaction takes place simultaneously $$C + CO_2 ==> 2CO$$

as well as endothermic hydrogen reactions, e.g.

$$C + H_2O ==> H2 + CO$$

$$C_xH_y + XH_2O ==> (X+Y/2)H_2 + XCO$$

During a residence time of at least 2 seconds and gas temperatures above 1200° C., chlorinated hydrocarbons, dioxins and furans as well as other organic compounds are eliminated. The main components of the synthesis gas produced are $H_2$, CO, $CO_2$ and $H_2O$, Subsequent shock cooling of the synthesis gas from 1200° C. to below 90° C. with water prevents reformation of chlorinated hydrocarbons. The synthesis gas passes through multi-stage cleaning, in which the contaminants are absorbed or condensed.

In an advantageous development, the method provides that at least 70%, preferably 100%, of the produced synthesis gas is used for the reaction into hydrocarbons. The non-used proportion of synthesis gas is thereby used advantageously for covering the inherent energy requirement of the disposal method. This entails the advantage that a neutral energy balance of the method is ensured. Furthermore, it is an advantage of the method that a quasi-emission-free course is carried out.

In a further preferred embodiment, the gaseous, liquid and/or solid by-products resulting from the reaction of the synthesis gas into hydrocarbons are returned to the high temperature zone of the synthesis gas production so that the Fischer-Tropsch synthesis can be also implemented without further waste which would require subsequent disposal.

In a further preferred embodiment, the by-products of the Fischer-Tropsch synthesis are used to cover the inherent energy requirement of the disposal method.

In order to achieve good yields, it is favourable if the reaction is implemented in a temperature range of 200° C. to 350° C. and pressures of 10-30 bar according to the general reaction equation:

$$nCO + (2n+1)H_2 \rightarrow C_nH_{2n+2} + nH_2O$$

The reaction is known in the state of the art as the Fischer-Tropsch process. Reference is made in this respect to the optimised method conditions known to the person skilled in the art and mentioned in the state of the art, such as e.g. pressure, temperatures and catalyst systems.

Furthermore, it is advantageous if the method is controlled such that the hydrocarbons have on average 5 to 20 carbon atoms and are as unbranched as possible. With the Fischer-Tropsch synthesis, the synthesis of longer-chain hydrocarbons is also possible in general; longer-chain hydrocarbons, e.g. paraffins, have however too high a melting point to be able to be used as liquid fuel. Hydrocarbons which have on average 5 to 20 carbon atoms are suitable however for use as synthetic diesel fuel.

Since the synthesis gas for the Fischer-Tropsch process which is obtained from the gasification method has a relatively unfavourable volume ratio of carbon monoxide to hydrogen, it is advantageous in addition if the volume ratio of carbon monoxide to hydrogen is moved in a shift reaction in favour of hydrogen before the polymerisation reaction. This shift reaction is likewise known to the person skilled in the art from the state of the art; reference is made to the optimised reaction conditions and catalysts used.

In a further embodiment, the volume ratio of carbon monoxide to hydrogen is thereby adjusted in the shift reaction to at least 1 to 1.5, preferably at least 1 to 2.

The method according to the invention is explained subsequently in more detail with reference to an example without wishing to restrict the invention to the method parameters used there.

PROPHETIC EXAMPLE FOR METHOD CONTROL

The method according to the invention is explained in more detail with reference to a Thermoselect plant which has two lines with respectively 15 t/h waste throughput, i.e. in total allows 30 t/h waste throughput. An average waste calorific value of 12 MJ/kg waste is thereby the basis of the operation. In the case of continuous operation of the plant, approx. 30,000 $Nm^3/h$ synthesis gas of the composition 38% by volume CO, 38% by volume $H_2$ and 14% by volume $CO_2$ can thereby be obtained. The fuel production is effected according to the Fischer-Tropsch process. In order to set a $CO/H_2$ ratio which is favourable for the Fischer-Tropsch reaction, a part of the CO is converted to form $H_2$ in a shift reaction:

$$CO + H_2O \rightarrow H_2 + CO_2$$

The $CO_2$ resulting is separated and 13% CO of the 38% CO in the synthesis gas is converted such that, a synthesis gas with 25% CO and 51% $H_2$ is obtained. The synthesis gas, which has been enriched with hydrogen and brought to a ratio of CO to $H_2$, is favourable for the Fischer-Tropsch reaction to produce diesel fuel:

$$25\% \ CO + 51\% \ H_2 => \text{"Diesel"}$$

The process results in 60% of the synthesis gas achieved as yield in the fuel production. This is very close to the value in the literature which indicates 75% for an optimised method under laboratory conditions. The specific volumetric weights of CO and hydrogen were the basis for the calculation of the material balance. The equation is indicated in the following $$21{,}000 \ m^3/h(0.25 \cdot 1.258 \ kg/m^3 + 0.51 \cdot 0.089 \ kg/m^3) = 7557 \ kg/h$$

In the case of an average density of 0.83 kg/l of the synthetic diesel, a quantity of 7,800 l/h diesel is hence produced. With a 2-line Thermoselect plant, 7,800 litres of diesel can therefore be produced per hour.

The invention claimed is:

1. A method for forming hydrocarbons from waste material, comprising:
   compressing the waste material into compact packets;
   passing the packets through at least one low temperature zone and at least one high temperature zone to produce a synthesis gas;
   passing the synthesis gas through a gas-permeable bed and a stabilization zone situated above the bed;
   converting only a portion of the synthesis gas to hydrocarbon molecules by Fischer-Tropsch synthesis;
   using energy inherent in the portion of the synthesis gas not converted to hydrocarbon molecules to cover at least a portion of the energy requirement of the method.

2. The method of claim 1, wherein the portion of synthesis gas converted to hydrocarbon molecules is at least 70%.

3. The method of claim 1 wherein gaseous, liquid or solid by-products resulting from the conversion of the waste material to hydrocarbon molecules are recycled to the at least one high temperature zone.

4. The method of claim 3, wherein energy inherent in the recycled by-products are used to cover at least a portion of the energy requirement of the method.

5. The method of claim 1 wherein the conversion of synthesis gas to hydrocarbon molecules occurs in a temperature range of 200° C. to 350° C. according to the reaction equation:

$$nCO + (2n+1)H_2 \rightarrow C_nH_{2n+2} + nH_2O.$$

6. The method of claim 1 wherein the hydrocarbon molecules have an average of 5 to 20 carbon atoms.

7. The method of claim 1 wherein the volume ratio of carbon monoxide to hydrogen in the synthesis gas is moved in a shift reaction in favor of hydrogen prior to the Fischer-Tropsch synthesis.

8. The method of claim 7 wherein the volume ratio of carbon monoxide to hydrogen is at least 1:1.5 after the shift reaction.

9. The method of claim 1 wherein the hydrocarbon molecules comprise a fuel composition.

10. The method of claim 1 wherein the hydrocarbon molecules comprise a diesel fuel composition.

* * * * *